3,198,142
METHOD AND MEANS FOR PREPARING DOUGH
Herbert G. Lothes, Atlanta, Ga., assignor to Baker Perkins Inc., Saginaw, Mich., a corporation of New York
Filed Apr. 27, 1961, Ser. No. 106,063
10 Claims. (Cl. 107—30)

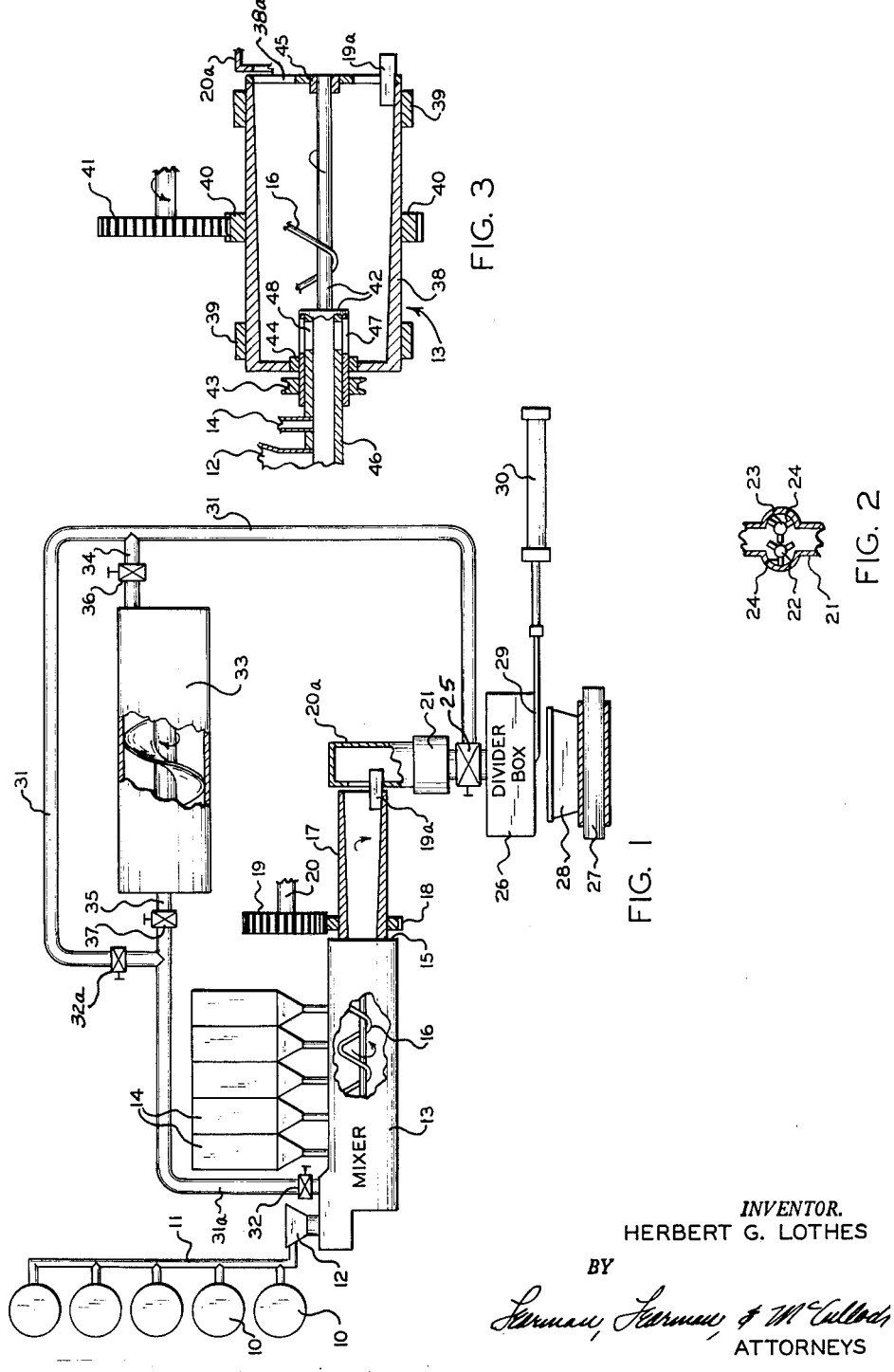

This invention relates to the manufacture of dough up to the point where the dough pieces are to be delivered to a final proofer before proceeding to the baking oven.

It has, of course, long been recognized that the manufacture of bread dough particularly is an exteremely critical operation and requires a rigid control of the ingredients used and the various steps of fermenting and working, to achieve the desired flavor, grain and texture in the baked bread product. Presently practiced baking processes are thoroughly discussed in various treatises and issued patents such as Baker Patent No. 2,953,460 and this information will not be repeated herein. Various methods for achieving continuous dough production have been suggested and some commercial success has been achieved with several continuous processes which are currently practiced in the commercial production of biscuit and bread dough pieces. However, bakers are continually seeking a product with better flavor and also are continually seeking bread processing methods which turn out dough pieces of increased uniformity in weight.

One of the prime objects of the present invention is to provide a continuous process, and apparatus for carrying out the process, which not only obviates the need for expensive dividing, rounding, intermediate proofing, and molding equipment but further provides a product having the requisite flavor characteristics which is highly uniform in substance and accordingly in weight.

A further object of the invention is to provide a continuous process capable of continuously manufacturing sponge, brew, and straight doughs, or any combinations of the aforesaid.

Another object of the invention is to provide a continuous process which need not, but may, use oxidizing and reducing agents in the production of the dough pieces to achieve a loaf in which there is a fine subdivision and uniform dispersion of gas cells, and which has optimum resilience, stiffness, smoothness, elasticity and gas retaining ability in the developed dough.

A further object of the invention is to provide a process for continuously manufacturing a variety of breads at variable speeds which can be used in conjunction with the present mixing equipment in many bakeries and does not require expensive and heavy machinery which takes up an excessive amount of space and necessitates expensive foundation changes.

As noted, a prime object of the invention is the development of optimum flavor and appearance in the finished bread. This is accomplished in the present process by substantially fully developing the dough in an open, unconfined atmosphere. This step represents a considerably departure from the process taught in the aforementioned patent wherein the dough is worked in a free or unconfined region for only a short period prior to passing to a mixer in which it is confined and subjected to pressure while being worked to a stage of full development.

A further object of the invention is to provide a process which in manufacturing dough continuously for final proofing does not adversely affect the gassing ability and gas retention characteristic of the dough.

Briefly, the present process contemplates the step of fully fermenting and working the dough in an unconfined region, during which time gases can pass to atmosphere and fermentation is not retarded. Thence, according to the process to be initially described, the substantially fully developed dough, which has a high free gas content, is subjected to centrifugal forces of a nature to compress the cells in the dough and drive some of the gases back into solution in the dough prior to the step of division into dough pieces of a particular size and relatively constant weight.

Other objects and advantages of the invention will be pointed out specifically or will become apparent from the following description when it is considered in conjunction with the appended claims and the accompanying drawings, in which:

FIGURE 1 is a schematic, side elevational view of typical apparatus which may be employed in practicing the process to now be described in detail;

FIGURE 2 is a sectional view illustrating a dough pump which could be used in the process; and FIGURE 3 is a side, sectional view of modified apparatus.

Referring now more particularly to FIGURE 1, a method for making dough pieces by the sponge dough process will be described, a numeral 10 is employed to indicate sponge tanks in which the sponge is contained. The process to be described can also be employed to process dough by the straight dough and brew dough methods and to make a wide variety of dough products. The sponge is typically made up of 50% to 75% of the total flour, although any suitable percentage may be used, together with the yeast, and a proportion of the water. If improving agents are used they may also be incorporated in the sponge. The sponge may be pumped or gravity fed continuously through the line 11 to the inlet 12 of the mixer 13 of conventional design in which the dough is mixed to a stage of desired development. The mixer shown in Ivarsson Patent No. 2,732,186 may be employed and conventional ingredients scalers 14 for adding the remaining flour and water and any supplemental ingredients such as salt, sugar, milk, and shortening, can be arranged to feed into the mixer as shown.

It is important to understand that the mixer is open to atmosphere through its charge spout 12, and possibly other openings, and the dough being worked in the mixer 13 does not completely fill the chamber of the mixer, so that the mixer is devoid of compression on the mass and will permit free communication with the atmosphere or other avenue of gas release. In the mixing operation, gas which is given off during the development of the dough will be freely released.

By the time the dough is processed to the discharge end 15 of the mixer 13 in its relatively slow, continuous travel through the mixer 13, it has reached a stage of proper development in which the gluten is fully developed and the dough has maximum gas cell retention characteristics. As can be seen, the mixer 13 includes a helical stirring rod 16 which gradually conveys the dough at a slow rate of speed gauged to permit it to achieve a state of substantially full development. By way of illustration, a sponge dough may require a time of 5 to 15 minutes to proceed from one end of the mixer 13 to the other and at the time of release out end 15 the dough will have reached a state of full development in which it has a maximum or desired resistance to mixing. At this time, assuming that the first dough proceeding through mixer 13 has just reached the discharge end of the mixer 13, the power demand and consumption required for driving the mixer would be at a maximum and would continue uniformly during full operation of the mixer. The desired rate of travel of the dough through mixer 13 can be readily determined experimentally by gauging the amount of power necessary to revolve the helical member 16 throughout the travel of a batch of dough from one end of the mixer to the other prior to the time the dough is processed in a continuous manner. Suffice it to say that for a given dough mixture containing a given type of flour, a curve of power against time may be plotted showing a peak or maximum power requirement, and it is at this time, when a peak power value is required, that the baker knows that the dough is developed. Of course, the actual time at which the power peak occurs differs rather widely with different flours and compositions of dough, so that the determination will have to be made according to the formula used and the speed of the member 16 accordingly is adjustable through a conventional variable speed unit or the like so that it can be set as desired. This test for determining when the dough is fully developed, prior to the time it becomes overdeveloped and the power requirement decreases, is well recognized in the art.

At the time of the transfer of the dough into a centrifuge, the gas cells in the dough have cell walls which can be stretched without rupturing, in the sense that they have a plastic fluidity but are of maximum strength and have good resilience. Because the dough has been allowed to properly ferment and release gases freely to atmosphere while achieving development in the mixer 13, optimum flavor characteristics are obtained. Mounted on one end of the internally flared basket-type centrifuge 17 is a pinion 18 in mesh with a drive gear 19 mounted on a shaft 20 which is connected with a suitable electric motor or the like for driving the centrifuge 17 at the desired rate of speed.

The centrifuge 17 can be of any desired shape or design and the only requirement is that it subject the dough to centrifugal forces which tend to compress the dough along the periphery of its internal wall. If the centrifuge is downwardly sloped or outwardly flared the travel of the dough from one end of the centrifuge to the other is facilitated. The centrifugal forces applied to the dough, which forms a relatively thin layer along the inner peripheral wall of the centrifuge 17, must be materially greater than those required merely to retain the dough in contact with the internal wall of the centrifuge 17. The compressive force acting upon the dough in the centrifuge 17 has the effect of reducing the size of the gas cells and thereby driving some of the free carbon dioxide and other gases back into solution in the dough pieces. That this occurs is known because the acid content of the dough pieces after centrifuging, as measured by their pH factor, has increased. However, the centrifugal forces cannot be so great that undue rupturing of the cells in the dough occurs. If the centrifugal force applied is too great, the cell structures of the dough rupture and the resulting bread, after baking, would have an open, cellular structure which is, of course, undesirable.

In tests which were conducted and which will be mentioned later, it was found that for good results the dough should be in a centrifuge of about 16 inches in diameter and rotating at approximately 6000 r.p.m. about 4 minutes. It is believed as of this time that centrifugal forces should not apply a pressure less than about 5 p.s.i. to any dough nor more than about 100 p.s.i. Further, it is believed as of this time that any dough should be centrifuged for a sufficient length of time so that the undissolved gas content is reduced to about 1–2% by volume for best results. From the standpoint of time in the centrifuge, it is considered evident at this point that any dough must be centrifuged for a length of time sufficient to change its acidity as measured by the pH factor from what it would have been if it had not been centrifuged. To improve the cellular structure of the baked bread at least some of the free gases should be driven back into solution by the centrifugal forces applied. The best speed of rotation for a centrifuge of given diameter and the proper length for such a centrifuge which must handle a variety of doughs is thus readily determinable. If the dough is not subjected to sufficient centrifugal forces for a suitable length of time, there will be no significant change in the acidity of the dough as measured by the pH factor thereof, whereas if the centrifugal force on the dough is excessive, rupturing of cell walls will occur.

Any suitable member can be employed to facilitate discharge of the dough from the centrifuge 17. In the present instance, a stationary curvilinear plow element 19a situated at an angle to the axis of rotation of the centrifuge 17 is shown for the purpose of diverting dough to the conduit 20a in which a dough pump 21 is provided, as shown. The dough pump is preferably of the worm type but can be of any suitable nature.

In FIGURE 2 an alternative intermeshing paddle pump is shown for illustrative purposes only. This construction contemplates shafts 22 and 23 driven in opposite directions with sets of paddles 24 thereon to move the dough through a valve 25 to a divider box 26 mounted over a belt conveyor 27 which carries pans 28 successively under the divider box 26. A horizontally reciprocating knife 29 powered by a cylinder 30 can be used to sever the dough from the reduced size opening in the bottom wall of the divider box 26 to the end that dough pieces are deposited in the pans 28. Alternatively, any other suitable severing arrangement including a pair of horizontally reciprocable severing knives could be employed.

Because the dough has been centrifuged, it will be found to have cells which are reduced in size and uniform in volume. A maximum number of cells per unit volume of dough are provided which are homogeneously distributed in the dough and the dough pieces will be more uniform in character and weight after division than the dough pieces it has heretofore been possible to produce on a batch basis. The result will be baked bread of fine grain and good texture which maintains a high standard of uniformity and natural flavor.

It may be that the travel of the pans 28 on conveyor 27 will be interrupted for some reason and, if this should occur, I have provided a return line 31, 31a, including valves 32a and 32, which leads back to the charge end of the mixer 13. The valve 25 is a proportional valve which can completely divert the dough to line 31, divert a proportionate amount of it, or close off line 31 altogether. A one way valve 32 is employed in conduit 31a which passes dough freely from the line 31a but will not permit it to enter.

In conjunction with the return line 31 a re-ferment tank 33 for dough to be returned can be connected to bridge conduit 31, 31a, as shown, a conduit 34 leading into the tank 33 from line 31, and a conduit 35 leading from the tank 33. Valves 36 and 37 are provided, as shown, to open and close the conduits 34 and 35 as desired. It has been determined that in some processing the flavor of the bread can be enhanced if there is a return and re-fermentation of some of the dough for re-centrifuging with the dough proceeding from mixer 13. Thus, in some bakeries, it may be desirable to continuously divert a small part of the dough from line 31 to the tank 33.

The process as practiced in the manner outlined is not substantially different when the straight or brew dough methods are employed. Clearly, all of the ingredients could be supplied to the charge end 12 of the mixer initially for the straight dough method by a multiplicity of suitably located tanks 14 and the brew dough process could be practiced with the existing equipment by feeding the brew from tanks 10 and the remaining ingredients from hoppers 14.

Further, it is contemplated as another embodiment of the invention that the mixer 13 could be so mounted that the entire outer housing revolves and he development of the dough is assisted by centrifugal force. Such a housing 38 is shown in FIGURE 3, wherein bearings 39 support the housing 38 and gears 40 and 41 drive it. The drive shaft 42 on which a drive pulley 43 can be mounted and on which helical member 16 is fixed can extend into bearings 44 and 45. In this instance, the housing of the mixer 13 would take the place of the centrifuge 19 and rotate at a speed to apply centrifugal forces of the nature previously discussed. The mixer would discharge developed dough, of the same character as the process depicted in FIGURE 1 after centrifuging, out opening 38a to the housing 20a and pump 21 which would pump the centrifuged dough to the divider box 26. This process may be continuous if the conduit 11 and hoppers 14 feed into a nonrotatable axial tube 46 leading into the enlarged tubular end of drive shaft 42 which has openings 47 therein, tube 46 having openings 48. The rate of feed contemplated is such that dough would not completely fill housing 38.

The elapsed time for the dough to travel from the mixer to the centrifuge and from the centrifuge to the divider box is in all cases so short that it is a negligible factor and has no material effect on the dough. It may be desirable to supplement the pump 21 with a relatively short worm extruder which would rotate at such speed that it would not work the dough appreciably to substantially affect it following centrifuging.

Certain laboratory tests have been conducted in conjunction with the development of the aforedescribed continuous process in which sample loaves of bread were produced, proofed, and baked. In these tests the dough was processed according to a formula in which the ingredients were present as follows:

| | Parts by weight |
|---|---|
| Flour | 100 |
| Water | 63.5 |
| Salt | 2 |
| Sugar | 8 |
| Compressed yeast | 3 |
| Shortening | 3 |
| Dry milk solids | 4 |
| Yeast food | .5 |
| Malt syrup | .5 |

A dough mixture having this formula was then processed according to the straight dough, sponge dough, and brew dough methods as set forth in the following examples:

*Example I.*—1107 grams of dough, mixed according to the above formula until fully developed by the straight dough method, were divided into a number of dough pieces. Certain of the dough pieces were centrifuged for 4 minutes at approximately 6000 r.p.m. in a centrifuge having a diameter of 16 inches, while other loaves were not. One loaf of each type was then proofed for 40 minutes and 50 minutes, and baked for 20 minutes. The centrifuged loaves compared favorably with bread loaves produced commercially by the batch method in flavor, texture, and grain.

*Example II.*—A sponge dough was made up in which, initially, 420 grams of flour, 228.6 grams of water, 3 grams of salt, 19.2 grams of sugar, 18 grams of compressed yeast, 3 grams of yeast food, and 3 grams of malt syrup were mixed and allowed partial fermentation. Thence, 180 grams of flour, 152.4 grams of water, 9 grams of salt, 28.8 grams of sugar, 18 grams of shortening, and 24 grams of dry milk solids were added and mixed in until full development was attained. During mixing, the dough was not in a confined region and was free to discharge freed gases. The sponge fermentation time was 240 minutes. Some of the dough pieces formed from this dough mix were then centrifuged exactly as in Example I and all were proofed for 50 minutes and baked for 20 minutes. The centrifuged samples were of good quality and compared favorably to the non-centrifuged samples in flavor, texture, size, and grain.

*Example III.*—A brew dough mixture was made up in which initially 381 grams of water, 12 grams of salt, 19.2 grams of sugar, 18 grams of compressed yeast, 24 grams of dry milk solids, 3 grams of yeast food, and 3 grams of malt syrup were fermented and 600 grams of flour, 28.8 grams of sugar, and 18 grams of shortening were then mixed in under conditions in which the mixing container was open to atmosphere and the dough therein was not confined and accordingly not pressurized, until a fully developed dough was obtained. The total brew fermentation time was 180 minutes. Again only several of the dough pieces formed from this dough mixture were centrifuged in the same manner as previously and all were proofed for 50 minutes and baked in an oven for 20 minutes. The dough pieces that were centrifuged for 4 minutes and subjected to centrifugal forces were found to produce satisfactory, tasty bread loaves of at least equal quality to those which had not been centrifuged.

To determine the effect of centrifuging, additional laboratory tests were run in which a brew dough made from a brew sponge containing 10% of the total flour was centrifuged for 4 minutes at approximately 6000 r.p.m. in the centrifuge mentioned. Acidity tests were conducted both before and after centrifuging and it was found that the pH factor of the dough before centrifuging was 5.5, while its factor after centrifuging was 5.2, this increase in degree of acidity clearly indicating that free soluble gases had been driven back into solution in the dough during the centrifuging operation.

That dough which has been centrifuged does not lose its gassing ability is indicated by further tests in which some brew dough in which the brew also contained 10% of the flour was revolved at approximately 6000 r.p.m. in the centrifuge for 4 minutes. A mercury manometer was used to take pressure readings at fifteen minute intervals and the results were as follows:

*Pressure*

| Time | Centrifuged Dough, mm. | Non-Centrifuged Dough, mm. |
|---|---|---|
| 0 | 0 | 0 |
| 15 | 52 | 51 |
| 30 | 85 | 85 |
| 45 | 120 | 118 |
| 60 | 144 | 143 |

From the foregoing it should be apparent that a very useful continuous process for the manufacture of bread dough has been invented which can be used to provide a great variety of highly uniform breads and leavened products of good characteristics which are equal or superior in flavor, texture, and grain to the products presently manufactured in the batch manner. The process is a relatively simple one in terms of the machinery and control required and can readily be run at variable speeds to provide the capacity desired.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In a method of making dough, the steps of: mixing dough ingredients and developing the mixture into an expanded dough mass having gas cells with an entrapped gas content; and revolving said dough mass with the interior wall surface of a revolving vessel at a speed sufficient to subject said dough to centrifugal forces of such magnitude as to compress the gas cells and drive some of the entrapped gas into solution in the dough.

2. In a method of making dough, the steps of: continuously mixing dough ingredients to form dough with cells and developing the mixture into a dough having entrapped gas in the cells of the dough so formed; and revolving said mixed dough in a centrifuge to subject it to centrifugal forces materially greater than those necessary to retain the dough on the wall of the centrifuge to deflate the cells and drive a quantity of the entrapped gas into solution so that the acid content of the dough is increased.

3. In a method of making dough, the steps of: mixing dough ingredients and developing the mixture into an expanded dough mass having an entrapped gas content; and simultaneously revolving the dough mass in a centrifuge at a speed to subject said dough to centrifugal forces which compress the gas cells and drive some of the gas into solution.

4. In a method of making bread, the steps of: mixing dough ingredients to form dough with cells and developing the mixture to provide a dough with entrapped gas in the cells of the dough so formed; revolving said mixed dough in a centrifuge to subject it to centrifugal forces materially greater than those necessary to retain the dough on the wall of the centrifuge to deflate the gas cells and drive a quantity of the gas into solution and increase the acid content of the dough; dividing the dough into loaf-sized dough pieces; proofing the dough pieces; and baking the dough pieces in an oven.

5. Apparatus for making dough, including: means for continuously mixing dough ingredients and developing the mixture into a dough having cells with entrapped gas; and means for receiving and revolving said mixed dough including a centrifuge to subject it to centrifugal forces materially greater than those necessary to retain the dough on the wall of the centrifuge.

6. Apparatus for making dough, including: means for mixing dough ingredients and developing the mixture into an expanded dough mass with cells having an entrapped gas content; centrifuge means receiving said dough mass for subjecting said dough to centrifugal forces of such magnitude as to compress the cells and drive some of the gas into solution in the dough without rupturing the gas cells; and means for driving said centrifuge means at a speed to develop said centrifugal forces.

7. Apparatus for making dough, including: a rotatable housing including a mixing element for continuously mixing dough ingredients and developing the mixture to provide entrapped gas in the cells of the dough formed; and means revolving said housing at a speed to subject it to centrifugal forces materially greater than those necessary to retain the dough on the wall of the centrifuge to retard the growth of the gas cells during development of the dough and drive some of the gas into solution.

8. In a method of making dough, the steps of: mixing dough ingredients and developing the mixture in an unconfined region open to atmosphere into an expanded dough mass having cells with an entrapped gas content; and simultaneously, during mixing and developing, revolving the dough in a centrifuge to subject said dough to centrifugal forces of such magnitude as to retard growth of the gas cells and drive some of the gas into solution.

9. In a method of making dough, the steps of: mixing dough ingredients to form dough with cells and fermenting the mixture in an unconfined region open to atmosphere to provide free gas in the cells of the dough so formed; and revolving said mixed dough in a centrifuge to subject it to centrifugal forces materially greater than those necessary to retain the dough on the wall of the centrifuge to deflate the cells and drive a quantity of the free gas into solution and increase the acid content of the dough.

10. Apparatus for making dough, including: means for mixing dough ingredients and developing the mixture into an expanded dough mass having gas cells with an entrapped gas content; said means including a revolving vessel having an interior wall for supporting thereon a dough mass; and means for revolving said vessel at a speed sufficient to engage the dough mass with the interior wall surface of the vessel and subject it to centrifugal forces of such magnitude as to drive some of the entrapped gas into solution in the dough.

References Cited by the Examiner
UNITED STATES PATENTS

| | | | |
|---|---|---|---|
| 2,996,022 | 8/61 | McCashen | 107—54.2 |
| 3,033,132 | 5/62 | Duncan | 107—54.2 |

WALTER A. SCHEEL, *Primary Examiner.*

JOSEPH D. SEERS, CHARLES A. WILLMUTH, ROBERT E. PULFREY, *Examiners.*